US006696386B2

United States Patent
Inoue et al.

(10) Patent No.: US 6,696,386 B2
(45) Date of Patent: Feb. 24, 2004

(54) EXHAUST GAS PURIFICATION CATALYST AND EXHAUST GAS PURIFICATION MATERIAL

(75) Inventors: Masahiro Inoue, Onojo (JP); Tatsuro Miyazaki, Fukuoka (JP); Nobuyuki Tokubuchi, Saga (JP); Masaaki Arita, Onojo (JP); Yota Hashimoto, Kasuga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/138,318

(22) Filed: May 6, 2002

(65) Prior Publication Data

US 2003/0092566 A1 May 15, 2003

(30) Foreign Application Priority Data

May 10, 2001 (JP) .......................................... 2001-140101
Dec. 10, 2001 (JP) .......................................... 2001-375610

(51) Int. Cl.⁷ ..................... B01J 27/055; B01J 27/043; B01J 27/045; B01J 27/047
(52) U.S. Cl. ..................... 502/218; 502/222; 502/223; 502/219; 502/527.15; 502/527.16
(58) Field of Search .................. 502/218, 222, 502/223, 219, 527.15, 527.16

(56) References Cited

U.S. PATENT DOCUMENTS 6,110,860 A * 8/2000 Inoue et al. ................. 502/218

FOREIGN PATENT DOCUMENTS

| JP | 58143840 | 8/1983 |
|---|---|---|
| JP | 58174236 | 10/1983 |
| JP | 442063 | 7/1992 |

OTHER PUBLICATIONS

European Search Report dated Mar. 13, 2003.
Patent Abstracts of Japan; vol. 012, No. 198(c–502), Jun. 8, 1988 & JP 62 298452 A(JGC Corp), Dec. 25, 1987, Derwent Publications Ltd., London, GB; AN 1988–039719 XP002231024.
Patent Abstracts of Japan; vol. 2000, No. 24, May 11, 2001 & JP 2001 187344 A (Matsushita Electric Ind Co Ltd), Jul. 10, 2001, Derwent Publications Ltd., London, GB; AN 2001–506568 XP002231025.
Patent Abstracts of Japan; vol. 2002, No. 08, Aug. 5, 2002 & JP 2002 102704 A (Matsushita Electric Ind Co Ltd), Apr. 9, 2002, Derwent Publications Ltd., London, GB; AN 2002–493741 XP002231026.
Patent Abstracts of Japan; vol. 2000, No. 19, Jun. 5, 2001 & JP 2001 046875 A (Matsushita Electric Ind Co Ltd), Feb. 20, 2001.

* cited by examiner

*Primary Examiner*—Elizabeth D. Wood
*Assistant Examiner*—Patricia L. Hailey
(74) *Attorney, Agent, or Firm*—Stevens, Davis, Miller & Mosher, LLP

(57) ABSTRACT

The present invention provides the exhaust gas purification catalysts containing a first catalyst component comprising an inorganic oxide having heat resistance and a transition metal oxide supported on the surface of the inorganic oxide and a second catalyst comprising at least one alkali metal sulfate, which have a high catalytic activity for the burning of particulates.

30 Claims, No Drawings

EXHAUST GAS PURIFICATION CATALYST AND EXHAUST GAS PURIFICATION MATERIAL

FIELD OF THE INVENTION

The present invention relates to an exhaust gas purification catalyst for purification of exhaust gases by burning particulates (solid carbon fine particles, liquid or solid high molecular weight hydrocarbon fine particles; hereinafter sometimes referred to as "PM") contained in exhaust gases discharged from diesel engines, and exhaust gas purification materials using the catalyst.

BACKGROUND OF THE INVENTION

Recently, it has become clear that particulates discharged from diesel engines are mostly less than 1 micron in their particle diameter and are apt to float in the atmosphere and readily taken into human bodies by breathing, and, besides, they contain carcinogenic substances such as benzpyrene. Thus, their effects on the human bodies have become serious. Under the circumstances, regulations against discharging of particulates from diesel engines are further tightened, and exhaust gas purification catalysts and exhaust gas purification materials which are capable of efficiently removing the particulates.

Hitherto, as one of the methods for the removal of particulates from exhaust gases, there is a method which comprises collecting particulates in exhaust gases using a heat resistant exhaust gas purification material having a three-dimensional structure, heating the exhaust gas purification material by a heating means such as a burner or an electric heater after rising of the back pressure, thereby burning the deposited particulates to convert them to carbon dioxide, and discharging the carbon dioxide to the outside.

However, the above method suffers from the problem that since the burning temperature of the particulates is high, a large energy is required for burning and removing the collected particulates and regenerating the filters. Further problem is that the filters undergo melting loss or cracking owing to the burning in a high temperature region and the reaction heat generated therein. Another problem is that the size of the purification apparatuses becomes large and the cost increases because special devices are required.

On the other hand, there are methods according to which the fine particles are subjected to burning reaction by the catalytic action of catalysts, thereby to perform burning and regeneration in the exhaust gas at the temperature of the exhaust gas without using heating means such as heaters.

As an exhaust gas purification material which supports a catalyst, there is a material which comprises a heat resistant three-dimensional structural body on which an exhaust gas purification catalyst is supported, and the particulates collected therein can be burnt at lower temperatures by the catalytic action of the exhaust gas purification catalyst.

If particulates can be burnt at the exhaust gas temperature using the above exhaust gas purification material having an exhaust gas purification catalyst supported thereon, there is no need to provide a heating means in an exhaust gas purification apparatus, and, thus, construction of the exhaust gas purification apparatuses can be simplified.

However, at present, for the exhaust gas purification materials on which an exhaust gas purification catalyst is supported, it is still difficult to burn sufficiently the particulates at the exhaust gas temperature, and a heating means must be used in combination. Accordingly, there has been desired development of exhaust gas purification catalysts on which is supported an exhaust gas purification materials having such a high catalytic activity as being capable of burning the particulates at lower temperatures.

As exhaust gas purification catalysts, those which contain oxides of metals such as copper and vanadium have been known to have relatively high activity.

For example, JP-A-58-143840 discloses "a particulate purification catalyst comprising a combination of at least one member selected from copper and compounds thereof and at least one member selected from metals and compounds thereof capable of having a plurality of oxidation states", and JP-A-58-174236 discloses "a catalyst for purification of particulates contained in exhaust gases which comprises at least one member selected from vanadium and vanadium compounds".

However, the exhaust gas purification catalysts disclosed in these patent publications have the problem that since the catalytic activity of the exhaust gas purification catalysts is not so high as capable of sufficiently burning the particulates at low temperatures of the exhaust gas temperatures, the particulates collected in the exhaust gas purification materials cannot be burnt at the exhaust gas temperatures, and, thus, a heating means must be used in combination.

Furthermore, JP-B-4-42063 discloses "an exhaust gas purification catalyst comprising a metal oxide such as of copper, manganese or molybdenum to which an alkali metal oxide and a noble metal are added, and a method for producing the same".

However, the exhaust gas purification catalyst disclosed in the above patent publication has the problem that the catalyst has an alkali metal oxide as a component, and the alkali metal oxide is inferior in heat resistance and is scattered by the heat of the exhaust gas or reacts with other catalyst components. Moreover, the exhaust gas purification catalyst has another problem that it is poisoned with sulfur oxide contained in the exhaust gas to cause deterioration of catalyst activity.

The present invention solves these problems encountered with the conventional techniques, and the object of the present invention is to provide an exhaust gas purification catalyst which has a high catalytic activity for burning of particulates, can exhibit sufficiently the respective catalytic characteristics, can sufficiently burn and remove particulates at a temperature close to the exhaust gas temperature, and is high in exhaust gas purification efficiency, and an exhaust gas purification material which can burn and remove particulates at a very high efficiency and is considerably excellent in endurance and economical efficiency.

SUMMARY OF THE INVENTION

The exhaust gas purification catalyst of the present invention for the solution of the above problems has a construction which contains a first catalyst component comprising an inorganic oxide having heat resistance and a transition metal oxide supported on the inorganic oxide and a second catalyst component comprising at least one alkali metal sulfate.

By allowing the catalysts having different functions to be separately present as mentioned above, their different catalytic characteristics can be sufficiently brought out and, furthermore, deterioration caused by reaction between the catalysts per se can be inhibited, and, as a result, deterioration of activity of the catalyst can be inhibited, whereby an exhaust gas purification catalyst of high activity can be obtained.

Moreover, by forming a catalyst component on the surface of a heat resistant inorganic oxide, the surface area of the catalyst increases, and thus the contact points with the particulates in the diesel exhaust gas increase. As a result, an exhaust gas purification catalyst of high activity can be obtained.

DETAILED DESCRIPTION OF THE INVENTION

The exhaust gas purification catalyst of the present invention contains a first catalyst component comprising an inorganic oxide having heat resistance and a transition metal oxide supported on the inorganic oxide and a second catalyst component comprising at least one alkali metal sulfate. That is, the catalysts having different functions are separately provided, whereby their respective different catalytic characteristics can be sufficiently brought out, deterioration caused by reaction between the catalysts per se can be inhibited, thus deterioration of activity of the catalyst can be inhibited, and, as a result, an exhaust gas purification catalyst of high activity can be obtained.

Moreover, a catalyst component is formed on the surface of an inorganic oxide having heat resistance, whereby the surface area of the catalyst increases, thus the contact points with the particulates in the diesel exhaust gas increase, and, as a result, an exhaust gas purification catalyst of high activity can be obtained.

Furthermore, a catalyst component is formed on the surface of an inorganic oxide having heat resistance, whereby the necessary amount of the catalyst can be reduced, and an exhaust gas purification catalyst can be obtained at low cost, and this is highly economical.

In addition, a transition metal oxide catalyst supported on an inorganic oxide having heat resistance and a catalyst of an alkali metal sulfate are separately provided and the surface area of the catalyst is increased, whereby the contact points with the particulates in the diesel exhaust gas increases, and the catalyst activity can be increased.

Furthermore, a transition metal oxide catalyst supported on an inorganic oxide having heat resistance and a catalyst of an alkali metal sulfate are separately provided and the surface area of the catalyst is increased, whereby necessary and sufficient amounts of the transition metal oxide and the alkali metal sulfate can be reduced and an exhaust gas purification catalyst can be obtained at low cost, and this is highly economical.

Moreover, a transition metal oxide catalyst supported on an inorganic oxide having heat resistance and a catalyst of an alkali metal sulfate are separately provided, whereby the reaction between the catalysts per se due to the heat in the burning of particulates can be inhibited, the different catalytic characteristics can be sufficiently exhibited, and, besides, deterioration of catalytic activity can be inhibited to enhance the endurance of the catalysts.

The exhaust gas purification catalyst of the present invention may further contain a noble metal as a third catalyst component.

The noble metal may be supported on the surface of the inorganic oxide separately from the transition metal oxide. In addition, the noble metal may be supported on the surface of the inorganic oxide together with the transition metal oxide. The ratio of the first catalyst component and the second catalyst component has no special limitation, however, preferably the weight ratio of the first catalyst component/the second catalyst component is 0.01–50, more preferably 0.1–5. The ratio of the inorganic oxide and the transition metal oxide of the first catalyst component has no special limitation, however, preferably, the weight ratio of the transition metal oxide/the inorganic oxide is 0.001–2, more preferably 0.01–0.5. The ratio of the third catalyst component has no special limitation, however, preferably the weight ratio of the noble metal/the inorganic oxide is 0.0001–0.2, more preferably 0.001–0.1.

The construction of an exhaust gas purification catalyst and an exhaust gas purification material in one embodiment of the present invention will be explained below.

First, the inorganic oxide having heat resistance as a carrier will be explained. As the inorganic oxides having heat resistance which support the transition metal oxide and the noble metal, there may be used at least one inorganic oxide selected from $Ta_2O_5$, $Nb_2O_5$, $WO_3$, $SnO_2$, $SiO_2$, $TiO_2$, $Al_2O_3$ and $ZrO_2$. Two or more of them may be used. By supporting the transition metal oxide and the noble metal catalyst components on the inorganic oxides, the surface area of the catalyst components is increased, the chance of contact with PM is increased, and the purification efficiency is improved. Furthermore, amount of the catalyst necessary for obtaining the same surface area can be reduced, and the cost can be decreased. The shape of the inorganic oxide has no special limitation, but spheres of 0.1–1000 $\mu$m in particle diameter are preferred.

Next, the transition metal oxide catalyst will be explained. As the transition metals, mention may be made of Cu, Mn, Co, V, Mo, W, etc., and one or more oxides of one or more of these metals can be used. In this specification, transition metal oxide includes composite transition metal oxide.

Specific examples of these transition metal oxides are $CuO$, $V_2O_5$, $CoO_3$, $MnO_2$, $MoO_3$, $WO_3$, etc., and one or two or more of them can be used.

Oxides of Cu are especially preferred, and as the oxides of Cu, there may be used at least one compound selected from $CuO$, $Cu_2O$, and $Cu_2O_3$.

The composite oxides are preferably composite oxides comprising Cu and V, and at least one compound selected from $Cu_5V_2O_{10}$, $CuV_2O_6$ and $Cu_3V_2O_8$ can be used. As other composite oxides, mention may be made of $CuMoO_4$.

These transition metal oxides can efficiently burn and remove PM and enhance the catalyst activity. Furthermore, by using the composite oxides comprising Cu and V, it becomes possible to remove PM at a temperature near the exhaust gas temperature.

The method for supporting the transition metal oxide on the inorganic oxide has no special limitation, and, for example, the methods referred to in the examples given hereinafter can be employed.

Next, the noble metals will be explained. Examples of the noble metals are Pt, Pd, Rh, Ru, etc., and one or two or more of these metals can be used. These noble metals can reduce harmful components present in the exhaust gas together with PM, such as carbon monoxide, nitrogen oxides, hydrocarbons, etc. Furthermore, since the noble metals react with hydrocarbons or carbon monoxide in the exhaust gas at low temperatures, the exhaust gas temperature rises and the catalytic activity of the transition metal oxide catalyst for PM can be increased. Among these noble metals, Pt can highly efficiently burn, for example, SOF component, etc. other than the carbon components of PM, thereby to purify the exhaust gas, and thus Pt is especially preferred.

The method for supporting the noble metal catalyst on the surface of the inorganic oxide or on the surface of the transition metal oxide has no special limitation, and, for example, the methods mentioned in the examples given hereinafter can be employed.

The combination of the noble metal catalyst and the transition metal oxide catalyst, namely, the combination of platinum (Pt) as the noble metal and the composite oxide of copper (Cu) and vanadium (V) as the transition metal composite oxide which are supported on titania ($TiO_2$) used as the inorganic oxides is very high in catalytic activity and is particularly preferred.

The transition metal oxide or noble metal supported on the surface of the inorganic oxide may be in the form of continuous layer or discontinuous stripes on the surface of the inorganic oxide. Further, the transition metal oxide or the noble metal may be in the dispersed state. That is, in the present invention, the transition metal oxide catalyst and the noble metal catalyst include the state of discontinuous stripes and the dispersed state.

As the alkali metals of the second catalyst containing an alkali metal sulfate, mention may be made of lithium (Li), sodium (Na), potassium (K), rubidium (Rb), cesium (Cs), etc., and it is preferred to use one or two or more sulfates of these alkali metals.

Specific examples of the alkali metal sulfates are lithium sulfate, sodium sulfate, potassium sulfate, rubidium sulfate, cesium sulfate, etc., and cesium sulfate alone or a mixture of cesium sulfate and potassium sulfate is especially preferred. By using the alkali metal sulfates, deterioration of the catalyst components caused by the sulfur components in the exhaust gas can be prevented and the catalytic activity for PM can be exhibited at its maximum.

Moreover, the above exhaust gas purification catalyst can be supported on a three-dimensional structural body having heat resistance. The method for supporting the catalyst has no special limitation, and, for example, the methods mentioned in the examples given hereinafter can be employed. As given in the examples, the second catalyst component may be supported on the upper surface of the first catalyst component, additionally, the first catalyst component may be contained in the second catalyst component. The amount of the catalyst supported has also no special limitation, and can be optionally set depending on, for example, the size of the three-dimensional structural body. As the materials of the three-dimensional structural body, metals, ceramics, etc. are used.

As the metals, there may be used iron, copper, nickel, chromium, etc. each alone or as alloys of two or more of them in combination.

As the ceramics, there may be used cordierite, aluminum titanate, mullite, α-alumina, zirconia, titania, silicon carbide, silica, silica.alumina, alumina.zirconia, etc.

The shape of the three-dimensional structural body having heat resistance on which the exhaust gas purification catalyst is supported has no special limitation, and there may be used ceramic honeycombs of wall-flow type, ceramic honeycombs, ceramic foams, metal honeycombs, metallic filters and metallic meshes of flow-through type, etc., and preferred are honeycomb-shaped filters of wall-flow type, and foams or metallic filters of flow-through type. Ceramic honeycombs of wall-flow type are especially preferred.

The materials of the honeycomb-shaped filters are not particularly limited, and metals, ceramics, etc. are used.

The shape of the foams has no special limitation, and examples are foam type filters having continuous pores in the three-dimensional direction.

The materials of the foams may be metals, ceramics, etc. and are not particularly limited, but ceramic foams of cordierite can be used suitably.

Foaming ratio of the foams is preferably 5–50/square inch, more preferably 10–30/square inch in terms of the number of pores.

The alkali metal sulfate formed and supported on the three-dimensional structural body having heat resistance may be in the state of a continuous layer or discontinuous stripes. Moreover, the alkali metal sulfate may be in the dispersed state.

That is, when the first catalyst component contained in the second catalyst component, more specifically, for example, powder particles of the inorganic oxide which support the transition metal oxide on their surface or powder particles of the inorganic oxide which support the noble metal on their surface are contained in the layer of the alkali metal sulfate on the three-dimensional structural body, these powder particles are not needed to be completely incorporated in the layer of the alkali metal sulfate, and they may be in the state of being dispersed in the area of the alkali metal sulfate which is in the state of discontinuous stripes or in the dispersed state.

In the present invention, the layer of the exhaust gas purification catalyst is not necessarily formed in such a state that the layer of the components is continuous, and at least the layer of the components can be present in the state of discontinuous stripes or in the dispersed state.

The present invention can be used for removal of particulates in the exhaust gases of not only automobile engines, but also engines of conveyance means such as cultivators, ships, trains, etc., industrial engines, combustion furnaces, boilers, etc.

The present invention is not limited to the above embodiments and variation can be made without departing from the spirit and scope of the invention.

EXAMPLES

Further illustrative examples will be explained below.

Example 1

1000 g of a titania powder (MC-90 manufactured by Ishihara Sangyo Co., Ltd.), 350 g of copper sulfate pentahydrate (manufactured by Wako Jun-yaku Co., Ltd.) as a salt of copper, and 95 g of vanadium oxide sulfate (manufactured by Wako Jun-yaku Co., Ltd.) as a salt of vanadium were added to 3300 g of purified water, followed by stirring well and then subjecting to vacuum drying by a cold evaporator. The resulting powder was calcined at 900° C. for 5 hours in an electric furnace to obtain a powder comprising titania on which a copper-vanadium composite oxide was supported.

10 g of the thus obtained powder and 10 g of cesium sulfate reagent were mixed in the state of powder in an agate mortar to obtain a powder catalyst containing cesium sulfate and a powder comprising titania on which a copper-vanadium composite oxide are supported.

Example 2

1000 g of a titania powder (MC-90 manufactured by Ishihara Sangyo Co., Ltd.), 350 g of copper sulfate pentahydrate (manufactured by Wako Jun-yaku Co., Ltd.) as a salt of copper, and 95 g of vanadium oxide sulfate (manufactured by Wako Jun-yaku Co., Ltd.) as a salt of vanadium were added to 3300 g of purified water, followed by stirring well and then subjecting to vacuum drying by a cold evaporator. The resulting powder was calcined at 900° C. for 5 hours in an electric furnace to obtain a powder comprising titania on which a copper-vanadium composite oxide was supported.

Separately, 1000 g of a titania powder (MC-90 manufactured by Ishihara Sangyo Co., Ltd.) and 36 g of tetramminedichloroplatinum (manufactured by Soekawa Kagaku Co., Ltd.) as a salt of platinum were added to 3300 g of purified water, followed by stirring well and then subjecting to vacuum drying by a cold evaporator. The resulting powder was calcined at 600° C. for 5 hours in an electric furnace to obtain a powder comprising titania on which platinum was supported.

10 g of the above powder comprising titania on which a copper-vanadium composite oxide was supported, 10 g of the above powder comprising titania on which platinum was supported and 10 g of cesium sulfate reagent were mixed in the state of powder in an agate mortar to obtain a powder catalyst containing cesium sulfate, a powder comprising titania on which a copper-vanadium composite oxide was supported, and a powder comprising titania on which platinum was supported.

Comparative Example 1

1000 g of a titania powder (MC-90 manufactured by Ishihara Sangyo Co., Ltd.), 350 g of copper sulfate pentahydrate (manufactured by Wako Jun-yaku Co., Ltd.) as a salt of copper, 95 g of vanadium oxide sulfate (manufactured by Wako Jun-yaku Co., Ltd.) as a salt of vanadium, and 220 g of cesium sulfate (manufactured by Soekawa Kagaku Co., Ltd.) were added to 3300 g of purified water, followed by stirring well and then subjecting to vacuum drying by a cold evaporator. The resulting powder was calcined at 900° C. for 5 hours in an electric furnace to obtain a powder comprising titania on which a copper-vanadium composite oxide and cesium sulfate were supported.

Comparative Example 2

1000 g of a titania powder (MC-90 manufactured by Ishihara Sangyo Co., Ltd.), 350 g of copper sulfate pentahydrate (manufactured by Wako Jun-yaku Co., Ltd.) as a salt of copper, 95 g of vanadium oxide sulfate (manufactured by Wako Jun-yaku Co., Ltd.) as a salt of vanadium, 220 g of cesium sulfate (manufactured by Soekawa Kagaku Co., Ltd.), and 36 g of tetramminedichloroplatinum (manufactured by Soekawa Kagaku Co., Ltd.) as a salt of platinum were added to 3300 g of purified water, followed by stirring well and then subjecting to vacuum drying by a cold evaporator. The resulting powder was calcined at 900° C. for 5 hours in an electric furnace to obtain a powder comprising titania on which a copper-vanadium composite oxide, cesium sulfate and platinum were supported.

Evaluation Example 1

The powder catalysts obtained in Example 1, Example 2, Comparative Example 1, and Comparative Example 2 were subjected to the following particulate burning experiment.

Each of the powder catalysts and a powder of sham particulates (carbon manufactured by Nakarai Co., Ltd.) were mixed at a weight ratio of 1:1 in a mortar, and the mixture was packed in a reaction tube of 12 mm in inner diameter made of silica glass. The inside of the reaction tube was heated at a constant rate by a tubular electric furnace disposed at the outer periphery of the reaction tube while passing a test gas comprising a nitrogen gas containing 5 vol % of oxygen, 50 ppm of $SO_2$, and 250 ppm of NO gas through the reaction tube at a flow rate of 500 cc/min. Concentration of carbon dioxide in the test gas was detected by a carbon dioxide sensor provided at the position on the side of exhaust gas, and the temperature at which 5% of the particulates were burnt (hereinafter referred to as "5% burning temperature) was determined. A burning ratio was calculated from the amount of carbon of the packed particulates (known value) and the amount of $CO+CO_2$ produced (measured value). The 5% burning temperatures of the exhaust gas purification catalysts in the burning test are shown in Table 1.

TABLE 1

|  | 5% burning temperature (° C.) |
|---|---|
| Example 1 | 251 |
| Example 2 | 232 |
| Comparative Example 1 | 280 |
| Comparative Example 2 | 274 |

As can be seen from Table 1, even when the same kind of catalyst composition was used, the exhaust gas purification catalyst obtained in Example 1 could burn the particulates at a temperature lower than the temperature in the case of using the exhaust gas purification catalyst obtained in Comparative Example 1, and the exhaust gas purification catalyst obtained in Example 2 could burn the particulates at a temperature lower than the temperature in the case of using the exhaust gas purification catalyst obtained in Comparative Example 2.

Example 3

1000 g of a titania powder (MC-90 manufactured by Ishihara Sangyo Co., Ltd.), 350 g of copper sulfate pentahydrate (manufactured by Wako Jun-yaku Co., Ltd.) as a salt of copper, and 95 g of vanadium oxide sulfate (manufactured by Wako Jun-yaku Co., Ltd.) as a salt of vanadium were added to 3300 g of purified water, followed by stirring well and then subjecting to vacuum drying by a cold evaporator. The resulting powder was calcined at 900° C. for 5 hours in an electric furnace to obtain a powder comprising titania on which a copper-vanadium composite oxide was supported.

70 g of the resulting powder, 1.6 g of Polity (manufactured by Lion Co., Ltd.) as a dispersing agent, 500 g of purified water, and 1000 g of zirconia balls of 2 mm were charged in a closed vessel of 1 liter, and dispersed for 2 hours by a slurry dispersing machine (manufactured by Red Devil Equipment Co.) to obtain a slurry containing a powder comprising titania on which a copper-vanadium composite oxide was supported.

Then, as a heat resistant three-dimensional structural body, a cordierite filter of wall-flow type (5.66 inches, 100 cells/inch, manufactured by NGK) was cut to 2 cells×5 cells×15 mm. This was impregnated with the slurry solution obtained above, and excess slurry was removed by an air gun, followed by carrying out a heat treatment at 600° C. for 5 hours in an electric furnace.

Furthermore, 40 g of cesium sulfate (manufactured by Soekawa Kagaku Co., Ltd.) was added to 500 g of purified water, followed by stirring well to obtain an aqueous solution containing cesium sulfate. The filter obtained above was impregnated with this aqueous solution, and excess solution was removed by an air gun, followed by drying the filter with a dryer and heat treating it at 600° C. for 5 hours in an electric furnace to obtain an exhaust gas purification material.

Example 4

1000 g of a titania powder (MC-90 manufactured by Ishihara Sangyo Co., Ltd.), 350 g of copper sulfate pentahydrate (manufactured by Wako Jun-yaku Co., Ltd.) as a salt of copper, and 95 g of vanadium oxide sulfate (manufactured by Wako Jun-yaku Co., Ltd.) as a salt of vanadium were added to 3300 g of purified water, followed by stirring well and then subjecting to vacuum drying by a cold evaporator. The resulting powder was calcined at 900° C. for 5 hours in an electric furnace to obtain a powder comprising titania on which a copper-vanadium composite oxide was supported.

Separately, 1000 g of a titania powder (MC-90 manufactured by Ishihara Sangyo Co., Ltd.) and 36 g of tetramminedichloroplatinum (manufactured by Soekawa Kagaku Co., Ltd.) as a salt of platinum were added to 3300 g of purified water, followed by stirring well and then subjecting to vacuum drying by a cold evaporator. The resulting powder was calcined at 600° C. for 5 hours in an electric furnace to obtain a powder comprising titania on which platinum was supported.

70 g of the above powder comprising titania on which a copper-vanadium composite oxide was supported, 40 g of the above powder comprising titania on which platinum was supported, 1.6 g of Polity (manufactured by Lion Co., Ltd.) as a dispersing agent, 500 g of purified water, and 1000 g of zirconia balls of 2 mm were charged in a closed vessel of 1 liter, and dispersed for 2 hours by a slurry dispersing machine (manufactured by Red Devil Equipment Co.) to obtain a slurry containing a powder comprising titania on which a copper-vanadium composite oxide was supported and a powder comprising titania on which platinum was supported.

Then, as a heat resistant three-dimensional structural body, a cordierite filter of wall-flow type (5.66 inches, 100 cells/inch, manufactured by NGK) was cut to 2 cells×5 cells×15 mm. This was impregnated with the slurry solution obtained above, and excess slurry was removed by an air gun, followed by carrying out a heat treatment at 600° C. for 5 hours in an electric furnace.

Then, 40 g of cesium sulfate (manufactured by Soekawa Kagaku Co., Ltd.) was added to 500 g of purified water, followed by stirring well to obtain an aqueous solution containing cesium sulfate. The filter obtained above was impregnated with this aqueous solution, and excess solution was removed by an air gun, followed by drying the filter with a dryer and heat treating it at 600° C. for 5 hours in an electric furnace to obtain an exhaust gas purification material.

Example 5

1000 g of a titania powder (MC-90 manufactured by Ishihara Sangyo Co., Ltd.), 350 g of copper sulfate pentahydrate (manufactured by Wako Jun-yaku Co., Ltd.) as a salt of copper, and 95 g of vanadium oxide sulfate (manufactured by Wako Jun-yaku Co., Ltd.) as a salt of vanadium were added to 3300 g of purified water, followed by stirring well and then subjecting to vacuum drying by a cold evaporator. The resulting powder was calcined at 900° C. for 5 hours in an electric furnace to obtain a powder comprising titania on which a copper-vanadium composite oxide was supported. 70 g of the powder obtained above, 40 g of cesium sulfate (manufactured by Soekawa Kagaku Co., Ltd.), 1.6 g of Polity (manufactured by Lion Co., Ltd.) as a dispersing agent, 500 g of purified water, and 1000 g of zirconia balls of 2 mm were charged in a closed vessel of 1 liter and dispersed for 2 hours by a slurry dispersing machine (manufactured by Red Devil Equipment Co.) to obtain a slurry containing cesium sulfate and a powder comprising titania on which a copper-vanadium composite oxide was supported.

Then, as a heat resistant three-dimensional structural body, a cordierite filter of wall-flow type (5.66 inches, 100 cells/inch, manufactured by NGK) was cut to 2 cells×5 cells×15 mm. This was impregnated with the slurry solution obtained above, and excess slurry was removed by an air gun, followed by drying the filter with a dryer and heat treating it at 600° C. for 5 hours in an electric furnace to obtain an exhaust gas purification material.

Example 6

1000 g of a titania powder (MC-90 manufactured by Ishihara Sangyo Co., Ltd.), 350 g of copper sulfate pentahydrate (manufactured by Wako Jun-yaku Co., Ltd.) as a salt of copper, and 95 g of vanadium oxide sulfate (manufactured by Wako Jun-yaku Co., Ltd.) as a salt of vanadium were added to 3300 g of purified water, followed by stirring well and then subjecting to vacuum drying by a cold evaporator. The resulting powder was calcined at 900° C. for 5 hours in an electric furnace to obtain a powder comprising titania on which a copper-vanadium composite oxide was supported.

Separately, 1000 g of a titania powder (MC-90 manufactured by Ishihara Sangyo Co., Ltd.) and 36 g of tetramminedichloroplatinum (manufactured by Soekawa Kagaku Co., Ltd.) as a salt of platinum were added to 3300 g of purified water, followed by stirring well and then vacuum drying by a cold evaporator. The resulting powder was calcined at 600° C. for 5 hours in an electric furnace to obtain a powder comprising titania on which platinum was supported.

70 g of the powder obtained above, 40 g of the powder obtained above, 40 g of cesium sulfate (manufactured by Soekawa Kagaku Co., Ltd.), 1.6 g of Polity (manufactured by Lion Co., Ltd.) as a dispersing agent, 500 g of purified water, and 1000 g of zirconia balls of 2 mm were charged in a closed vessel of 1 liter and dispersed for 2 hours by a slurry dispersing machine (manufactured by Red Devil Equipment Co.) to obtain a slurry containing cesium sulfate, a powder comprising titania on which a copper-vanadium composite oxide was supported and a powder comprising titania on which platinum was supported.

Then, as a heat resistant three-dimensional structural body, a cordierite filter of wall-flow type (5.66 inches, 100 cells/inch, manufactured by NGK) was cut to 2 cells×5 cells×15 mm. This was impregnated with the slurry solution obtained above, and excess slurry was removed by an air gun. Then, the filter was dried by a dryer and heat treated at 600° C. for 5 hours in an electric furnace to obtain an exhaust gas purification material.

Comparative Example 3

70 g of copper sulfate pentahydrate (manufactured by Wako Jun-yaku Co., Ltd.) as a salt of copper, 20 g of vanadium oxide sulfate (manufactured by Wako Jun-yaku Co., Ltd.) as a salt of vanadium and 40 g of cesium sulfate (manufactured by Soekawa Kagaku Co., Ltd.) were added to 500 g of purified water, followed by stirring well to obtain an aqueous solution containing copper sulfate, vanadium oxide sulfate and cesium sulfate.

Then, as a heat resistant three-dimensional structural body, a cordierite filter of wall-flow type (5.66 inches, 100 cells/inch, manufactured by NGK) was cut to 2 cells×5 cells×15 mm. This was impregnated with the solution obtained above, and excess slurry was removed by an air gun. Then, the filter was dried by a dryer and heat treated at 900° C. for 5 hours in an electric furnace to obtain an exhaust gas purification material.

Comparative Example 4

70 g of copper sulfate pentahydrate (manufactured by Wako Jun-yaku Co., Ltd.) as a salt of copper, 20 g of vanadium oxide sulfate (manufactured by Wako Jun-yaku Co., Ltd.) as a salt of vanadium, 40 g of cesium sulfate (manufactured by Soekawa Kagaku Co., Ltd.) and 1.5 g of tetramminedichloroplatinum as a salt of platinum were added to 500 g of purified water, followed by stirring well to obtain an aqueous solution containing copper sulfate, vanadium oxide sulfate, cesium sulfate and tetramminedichloroplatinum.

Then, as a heat resistant three-dimensional structural body, a cordierite filter of wall-flow type (5.66 inches, 100 cells/inch, manufactured by NGK) was cut to 2 cells×5 cells×15 mm. This was impregnated with the solution obtained above, and excess slurry was removed by an air gun. Then, the filter was dried by a dryer and heat treated at 900° C. for 5 hours in an electric furnace to obtain an exhaust gas purification material.

Comparative Example 5

1000 g of a titania powder (MC-90 manufactured by Ishihara Sangyo Co., Ltd.), 350 g of copper sulfate pentahydrate (manufactured by Wako Jun-yaku Co., Ltd.) as a salt of copper, 95 g of vanadium oxide sulfate (manufactured by Wako Jun-yaku Co., Ltd.) as a salt of vanadium, and 220 g of cesium sulfate (manufactured by Soekawa Kagaku Co., Ltd.) were added to 3300 g of purified water, followed by stirring well and then vacuum drying by a cold evaporator. The resulting powder was calcined at 900° C. for 5 hours in an electric furnace to obtain a powder comprising titania on which a copper-vanadium composite oxide and cesium sulfate were supported.

70 g of the powder obtained above, 1.6 g of Polity (manufactured by Lion Co., Ltd.) as a dispersing agent, 500 g of purified water, and 1000 g of zirconia balls of 2 mm were charged in a closed vessel of 1 liter and dispersed for 2 hours by a slurry dispersing machine (manufactured by Red Devil Equipment Co.) to obtain a slurry containing a powder comprising titania on which cesium and a copper-vanadium composite oxide were supported.

Then, as a heat resistant three-dimensional structural body, a cordierite filter of wall-flow type (5.66 inches, 100 cells/inch, manufactured by NGK) was cut to 2 cells×5 cells×15 mm. This was impregnated with the slurry obtained above, and excess slurry was removed by an air gun. Then, the filter was dried by a dryer and heat treated at 600° C. for 5 hours in an electric furnace to obtain an exhaust gas purification material.

Comparative Example 6

1000 g of a titania powder (MC-90 manufactured by Ishihara Sangyo Co., Ltd.), 350 g of copper sulfate pentahydrate (manufactured by Wako Jun-yaku Co., Ltd.) as a salt of copper, 95 g of vanadium oxide sulfate (manufactured by Wako Jun-yaku Co., Ltd.) as a salt of vanadium, 220 g of cesium sulfate (manufactured by Soekawa Kagaku Co., Ltd.), and 36 g of tetramminedichloroplatinum (manufactured by Soekawa Kagaku Co., Ltd.) as a salt of platinum were added to 3300 g of purified water, followed by stirring well and then vacuum drying by a cold evaporator. The resulting powder was calcined at 900° C. for 5 hours in an electric furnace to obtain a powder comprising titania on which a copper-vanadium composite oxide, cesium sulfate and platinum were supported.

70 g of the powder obtained above, 1.6 g of Polity (manufactured by Lion Co., Ltd.) as a dispersing agent, 500 g of purified water, and 1000 g of zirconia balls of 2 mm were charged in a closed vessel of 1 liter and dispersed for 2 hours by a slurry dispersing machine (manufactured by Red Devil Equipment Co.) to obtain a slurry containing a powder comprising titania on which cesium, a copper-vanadium composite oxide and platinum were supported.

Then, as a heat resistant three-dimensional structural body, a cordierite filter of wall-flow type (5.66 inches, 100 cells/inch, manufactured by NGK) was cut to 2 cells×5 cells×15 mm. This was impregnated with the slurry obtained above, and excess slurry was removed by an air gun. Then, the filter was dried by a dryer and heat treated at 600° C. for 5 hours in an electric furnace to obtain an exhaust gas purification material.

Comparative Example 7

40 g of a titania powder (MC-90 manufactured by Ishihara Sangyo Co., Ltd.), 1.6 g of Polity (manufactured by Lion Co., Ltd.) as a dispersing agent, 500 g of purified water, and 1000 g of zirconia balls of 2 mm were charged in a closed vessel of 1 liter and dispersed for 2 hours by a slurry dispersing machine (manufactured by Red Devil Equipment Co.) to obtain a slurry containing a titania powder.

Then, as a heat resistant three-dimensional structural body, a cordierite filter of wall-flow type (5.66 inches, 100 cells/inch, manufactured by NGK) was cut to 2 cells×5 cells×15 mm. This was impregnated with the slurry solution obtained above, and excess slurry was removed by an air gun, followed by heat treating the filter at 600° C. for 5 hours in an electric furnace.

Furthermore, 70 g of copper sulfate pentahydrate (manufactured by Wako Jun-yaku Co., Ltd.) as a salt of copper, 20 g of vanadium oxide sulfate (manufactured by Wako Jun-yaku Co., Ltd.) as a salt of vanadium, and 40 g of cesium sulfate (manufactured by Soekawa Kagaku Co., Ltd.) were added to 500 g of purified water, followed by stirring well to obtain an aqueous solution containing copper sulfate, vanadium oxide sulfate and cesium sulfate.

The filter obtained above was impregnated with the aqueous solution obtained above, and excess slurry was removed by an air gun. Then, the filter was dried by a dryer and heat treated at 900° C. for 5 hours in an electric furnace to obtain an exhaust gas purification material.

Comparative Example 8

40 g of a titania powder (MC-90 manufactured by Ishihara Sangyo Co., Ltd.), 1.6 g of Polity (manufactured by Lion Co., Ltd.) as a dispersing agent, 500 g of purified water, and 1000 g of zirconia balls of 2 mm were charged in a closed vessel of 1 liter and dispersed for 2 hours by a slurry dispersing machine (manufactured by Red Devil Equipment Co.) to obtain a slurry containing a titania powder.

Then, as a heat resistant three-dimensional structural body, a cordierite filter of wall-flow type (5.66 inches, 100 cells/inch, manufactured by NGK) was cut to 2 cells×5 cells×15 mm. This was impregnated with the slurry solution obtained above, and excess slurry was removed by an air gun, followed by heat treating the filter at 600° C. for 5 hours in an electric furnace.

Furthermore, 70 g of copper sulfate pentahydrate (manufactured by Wako Jun-yaku Co., Ltd.) as a salt of copper, 20 g of vanadium oxide sulfate (manufactured by Wako Jun-yaku Co., Ltd.) as a salt of vanadium, 40 g of cesium sulfate (manufactured by Soekawa Kagaku Co., Ltd.), and 1.5 g of tetramminedichloroplatinum as a salt of platinum were added to 500 g of purified water, followed by stirring well to obtain an aqueous solution containing copper sulfate, vanadium oxide sulfate, cesium sulfate and tetramminedichloroplatinum.

The filter obtained above was impregnated with the aqueous solution obtained above, and excess slurry was removed by an air gun. Then, the filter was dried by a dryer and heat treated at 900° C. for 5 hours in an electric furnace to obtain an exhaust gas purification material.

Comparative Example 9

1000 g of a titania powder (MC-90 manufactured by Ishihara Sangyo Co., Ltd.) and 36 g of tetramminedichloroplatinum (manufactured by Soekawa Kagaku Co., Ltd.) as a salt of platinum were added to 3300 g of purified water, followed by stirring well and then vacuum drying by a cold evaporator. The resulting powder was calcined at 600° C. for 5 hours in an electric furnace to obtain a powder comprising titania on which platinum was supported.

40 g of the powder obtained above, 1.6 g of Polity (manufactured by Lion Co., Ltd.) as a dispersing agent, 500 g of purified water, and 1000 g of zirconia balls of 2 mm were charged in a closed vessel of 1 liter and dispersed for 2 hours by a slurry dispersing machine (manufactured by Red Devil Equipment Co.) to obtain a slurry containing a powder comprising titania on which platinum was supported.

Then, as a heat resistant three-dimensional structural body, a cordierite filter of wall-flow type (5.66 inches, 100 cells/inch, manufactured by NGK) was cut to 2 cells×5 cells×15 mm. This was impregnated with the slurry solution obtained above, and excess slurry was removed by an air gun. Then, the filter was heat treated at 600° C. for 5 hours in an electric furnace.

Furthermore, 70 g of copper sulfate pentahydrate (manufactured by Wako Jun-yaku Co., Ltd.) as a salt of copper, 20 g of vanadium oxide sulfate (manufactured by Wako Jun-yaku Co., Ltd.) as a salt of vanadium, and 40 g of cesium sulfate (manufactured by Soekawa Kagaku Co., Ltd.) were added to 500 g of purified water, followed by stirring well to obtain an aqueous solution containing copper sulfate, vanadium oxide sulfate and cesium sulfate.

The filter obtained above was impregnated with the aqueous solution obtained above, and excess solution was removed by an air gun. Then, the filter was dried by a dryer and heat treated at 900° C. for 5 hours in an electric furnace to obtain an exhaust gas purification material.

Comparative Example 10

1000 g of a titania powder (MC-90 manufactured by Ishihara Sangyo Co., Ltd.) and 36 g of tetramminedichloroplatinum (manufactured by Soekawa Kagaku Co., Ltd.) as a salt of platinum were added to 3300 g of purified water, followed by stirring well and then vacuum drying by a cold evaporator. The resulting powder was calcined at 600° C. for 5 hours in an electric furnace to obtain a powder comprising titania on which platinum was supported.

40 g of the powder obtained above, 70 g of copper sulfate pentahydrate (manufactured by Wako Jun-yaku Co., Ltd.) as a salt of copper, 20 g of vanadium oxide sulfate (manufactured by Wako Jun-yaku Co., Ltd.) as a salt of vanadium, 40 g of cesium sulfate (manufactured by Soekawa Kagaku Co., Ltd.), 1.6 g of Polity (manufactured by Lion Co., Ltd.) as a dispersing agent, 500 g of purified water, and 1000 g of zirconia balls of 2 mm were charged in a closed vessel of 1 liter and dispersed for 2 hours by a slurry dispersing machine (manufactured by Red Devil Equipment Co.) to obtain a slurry containing a powder comprising titania on which platinum was supported, copper sulfate, vanadium oxide sulfate, and cesium sulfate.

Then, as a heat resistant three-dimensional structural body, a cordierite filter of wall-flow type (5.66 inches, 100 cells/inch, manufactured by NGK) was cut to 2 cells×5 cells×15 mm. This was impregnated with the slurry obtained above, and excess slurry was removed by an air gun. Then, the filter was dried by a dryer and heat treated at 900° C. for 5 hours in an electric furnace to obtain an exhaust gas purification material.

Evaluation Example 2

The exhaust gas purification materials obtained in Examples 3–6 and Comparative Examples 3–10 were subjected to the following particulate burning experiment.

A powder of sham particulate (carbon manufactured by Nakarai Co., Ltd.) was supported on the surface of the filter of one of the exhaust gas purification materials obtained in Examples 3–6 and Comparative Examples 3–10, and the filter was packed in a reaction tube of 12 mm in inner diameter made of silica glass.

The inside of the reaction tube was heated at a constant rate by a tubular electric furnace disposed at the outer periphery of the reaction tube while passing a test gas comprising a nitrogen gas containing 5 vol % of oxygen, 50 ppm of $SO_2$, and 250 ppm of NO gas through the reaction tube at a flow rate of 500 cc/min. Concentration of carbon dioxide in the test gas was detected by a carbon dioxide sensor provided at the position on the gas outlet side, and the temperature at which 5% of the particulates were burnt (hereinafter referred to as "5% burning temperature") was determined. A burning ratio was calculated from the amount of carbon of the packed particulates (known value) and the amount of CO+$CO_2$ produced (measured value). The 5% burning temperatures of the exhaust gas purification materials in the burning test are shown in Table 2.

TABLE 2

| | Transition metal oxide | Alkali metal sulfate | Noble metal | 5% burning temperature (° C.) |
|---|---|---|---|---|
| Example 3 | $Cu_5V_2O_{10}$ | Cesium sulfate | No | 295 |
| Example 4 | $Cu_5V_2O_{10}$ | Cesium sulfate | Pt | 285 |
| Example 5 | $Cu_5V_2O_{10}$ | Cesium sulfate | No | 292 |
| Example 6 | $Cu_5V_2O_{10}$ | Cesium sulfate | Pt | 289 |
| Comparative Example 3 | $Cu_5V_2O_{10}$ | Cesium sulfate | No | 340 |
| Comparative Example 4 | $Cu_5V_2O_{10}$ | Cesium sulfate | Pt | 344 |
| Comparative Example 5 | $Cu_5V_2O_{10}$ | Cesium sulfate | No | 355 |
| Comparative Example 6 | $Cu_5V_2O_{10}$ | Cesium sulfate | Pt | 341 |

TABLE 2-continued

| | Transition metal oxide | Alkali metal sulfate | Noble metal | 5% burning temperature (° C.) |
|---|---|---|---|---|
| Comparative Example 7 | $Cu_5V_2O_{10}$ | Cesium sulfate | No | 342 |
| Comparative Example 8 | $Cu_5V_2O_{10}$ | Cesium sulfate | Pt | 343 |
| Comparative Example 9 | $Cu_5V_2O_{10}$ | Cesium sulfate | Pt | 351 |
| Comparative Example 10 | $Cu_5V_2O_{10}$ | Cesium sulfate | Pt | 354 |

As can be seen from Table 2, even when the same kind of catalyst composition was used, the exhaust gas purification materials obtained in Examples 3–6 could burn the particulates at a temperature lower than the temperature at which the exhaust gas purification materials obtained in Comparative Examples 3–10 could burn the particulates.

Example 7

An exhaust gas purification material was produced in the same manner as in Example 4, except that $CuV_2O_6$ was used as the transition metal oxide.

Example 8

An exhaust gas purification material was produced in the same manner as in Example 4, except that CuO was used as the transition metal oxide.

Example 9

An exhaust gas purification material was produced in the same manner as in Example 4, except that $V_2O_5$ was used as the transition metal oxide.

Example 10

An exhaust gas purification material was produced in the same manner as in Example 4, except that $CuMoO_4$ was used as the transition metal oxide.

Example 11

An exhaust gas purification material was produced in the same manner as in Example 4, except that $CoO_3$ was used as the transition metal oxide.

Example 12

An exhaust gas purification material was produced in the same manner as in Example 4, except that $MnO_2$ was used as the transition metal oxide.

Example 13

An exhaust gas purification material was produced in the same manner as in Example 4, except that $MoO_3$ was used as the transition metal oxide.

Example 14

An exhaust gas purification material was produced in the same manner as in Example 4, except that $WO_3$ was used as the transition metal oxide.

Comparative Example 11

An exhaust gas purification material was produced in the same manner as in Example 4, except that $LaMnCoO_3$ was used as the transition metal oxide.

Evaluation Example 3

The particulate burning experiment was conducted on the exhaust gas purification materials of Examples 7–14 and Comparative Example 11 in the same manner as in Evaluation Example 2. The 5% burning temperatures of the exhaust gas purification materials in the burning test are shown in Table 3.

TABLE 3

| | Transition metal oxide | Alkali metal sulfate | Noble metal | 5% burning temperature (° C.) |
|---|---|---|---|---|
| Example 4 | $Cu_5V_2O_{10}$ | Cesium sulfate | Pt | 285 |
| Example 7 | $CuV_2O_6$ | Cesium sulfate | Pt | 292 |
| Example 8 | CuO | Cesium sulfate | Pt | 290 |
| Example 9 | $V_2O_5$ | Cesium sulfate | Pt | 298 |
| Example 10 | $CuMoO_4$ | Cesium sulfate | Pt | 299 |
| Example 11 | $CoO_3$ | Cesium sulfate | Pt | 311 |
| Example 12 | $MnO_2$ | Cesium sulfate | Pt | 310 |
| Example 13 | $MoO_3$ | Cesium sulfate | Pt | 305 |
| Example 14 | $WO_3$ | Cesium sulfate | Pt | 312 |
| Comparative Example 11 | $LaMnCoO_3$ | Cesium sulfate | Pt | 411 |

As can be seen from Table 3, when exhaust gas purification materials of the same structure were used, the exhaust gas purification materials in which the compounds used in Examples 4 and 7–14 were supported as the transition metal oxides could burn the particulates at the lower temperatures. It was found that high catalytic activity could be obtained especially when the composite compound of copper and vanadium and the copper oxide were used.

Example 15

An exhaust gas purification material was produced in the same manner as in Example 4, except that potassium sulfate+cesium sulfate were used as the alkali metal sulfate.

Example 16

An exhaust gas purification material was produced in the same manner as in Example 4, except that rubidium sulfate was used as the alkali metal sulfate.

Example 17

An exhaust gas purification material was produced in the same manner as in Example 4, except that potassium sulfate was used as the alkali metal sulfate.

Example 18

An exhaust gas purification material was produced in the same manner as in Example 4, except that sodium sulfate was used as the alkali metal sulfate.

Example 19

An exhaust gas purification material was produced in the same manner as in Example 4, except that lithium sulfate was used as the alkali metal sulfate.

Comparative Example 12

An exhaust gas purification material was produced in the same manner as in Example 4, except that calcium sulfate was used as the alkali metal sulfate.

Evaluation Example 4

The particulate burning experiment was conducted on the exhaust gas purification materials of Examples 15–19 and Comparative Example 12 in the same manner as in Evaluation Example 2. The 5% burning temperatures of the exhaust gas purification materials in the burning test are shown in Table 4.

TABLE 4

| | Transition metal oxide | Alkali metal sulfate | Noble metal | 5% burning temperature (° C.) |
|---|---|---|---|---|
| Example 4 | $Cu_5V_2O_{10}$ | Cesium sulfate | Pt | 285 |
| Example 15 | $Cu_5V_2O_{10}$ | Potassium sulfate + Cessium sulfate | Pt | 288 |
| Example 16 | $Cu_5V_2O_{10}$ | Rubidium sulfate | Pt | 310 |
| Example 17 | $Cu_5V_2O_{10}$ | Potassium sulfate | Pt | 305 |
| Example 18 | $Cu_5V_2O_{10}$ | Sodium sulfate | Pt | 312 |
| Example 19 | $Cu_5V_2O_{10}$ | Lithium sulfate | Pt | 321 |
| Comparative Example 12 | $Cu_5V_2O_{10}$ | Calsium sulfate | Pt | 411 |

As can be seen from Table 4, when exhaust gas purification materials of the same structure were used, the exhaust gas purification materials in which the compounds used in Examples 4 and 15–19 were supported as the alkali metal sulfates could burn the particulates at the lower temperatures. It was found that high catalytic activity could be obtained especially when cesium sulfate or cesium sulfate+ potassium sulfate was used.

Example 20

An exhaust gas purification material was produced in the same manner as in Example 4, except that Pt+Pd were used as the noble metal.

Example 21

An exhaust gas purification material was produced in the same manner as in Example 4, except that Pd was used as the noble metal.

Evaluation Example 5

The particulate burning experiment was conducted on the exhaust gas purification materials of Examples 20 and 21 in the same manner as in Evaluation Example 2. The 5% burning temperatures of the exhaust gas purification materials in the burning test are shown in Table 5.

TABLE 5

| | Transition metal oxide | Alkali metal sulfate | Noble metal | 5% burning temperature (° C.) |
|---|---|---|---|---|
| Example 4 | $Cu_5V_2O_{10}$ | Cesium sulfate | Pt | 285 |
| Example 20 | $Cu_5V_2O_{10}$ | Cesium sulfate | Pt + Pd | 288 |
| Example 21 | $Cu_5V_2O_{10}$ | Cesium sulfate | Pd | 310 |

As can be seen from Table 5, when exhaust gas purification materials of the same structure were used, the exhaust gas purification materials in which the compounds used in Examples 20 and 21 were supported as the noble metal could burn the particulates at the lower temperatures. It was seen that exhaust gas purification materials containing platinum were especially high in activity.

Example 22

An exhaust gas purification material was produced in the same manner as in Example 4, except that $TaO_2$ was used as the inorganic oxide having heat resistance on which the transition metal oxide was supported.

Example 23

An exhaust gas purification material was produced in the same manner as in Example 4, except that $Nb_2O_5$ was used as the inorganic oxide having heat resistance on which the transition metal oxide was supported.

Example 24

An exhaust gas purification material was produced in the same manner as in Example 4, except that $WO_3$ was used as the inorganic oxide having heat resistance on which the transition metal oxide was supported.

Example 25

An exhaust gas purification material was produced in the same manner as in Example 4, except that $SnO_2$ was used as the inorganic oxide having heat resistance on which the transition metal oxide was supported.

Example 26

An exhaust gas purification material was produced in the same manner as in Example 4, except that $SiO_2$ was used as the inorganic oxide having heat resistance on which the transition metal oxide was supported.

Example 27

An exhaust gas purification material was produced in the same manner as in Example 4, except that $Al_2O_3$ was used as the inorganic oxide having heat resistance on which the transition metal oxide was supported.

Example 28

An exhaust gas purification material was produced in the same manner as in Example 4, except that $ZrO_2$ was used as the inorganic oxide having heat resistance on which the transition metal oxide was supported.

Evaluation Example 6

The particulate burning experiment was conducted on the exhaust gas purification materials of Examples 22–28 in the same manner as in Evaluation Example 2. The 5% burning temperatures of the exhaust gas purification materials in the burning test are shown in Table 6.

TABLE 6

|  | Transition metal oxide | Inorganic oxide (supporting transition metal) | Alkali metal sulfate | Noble metal | 5% burning temperature (° C.) |
|---|---|---|---|---|---|
| Example 4 | $Cu_5V_2O_{10}$ | $TiO_2$ | Cesium sulfate | Pt | 285 |
| Example 22 | $Cu_5V_2O_{10}$ | $TaO_2$ | Cesium sulfate | Pt | 288 |
| Example 23 | $Cu_5V_2O_{10}$ | $Nb_2O_6$ | Cesium sulfate | Pt | 310 |
| Example 24 | $Cu_5V_2O_{10}$ | $WO_3$ | Cesium sulfate | Pt | 286 |
| Example 25 | $Cu_5V_2O_{10}$ | $SnO_2$ | Cesium sulfate | Pt | 312 |
| Example 26 | $Cu_5V_2O_{10}$ | $SiO_2$ | Cesium sulfate | Pt | 311 |
| Example 27 | $Cu_5V_2O_{10}$ | $Al_2O_3$ | Cesium sulfate | Pt | 321 |
| Example 28 | $Cu_5V_2O_{10}$ | $ZrO_2$ | Cesium sulfate | Pt | 311 |

As can be seen from Table 6, when exhaust gas purification materials of the same structure were used, the exhaust gas purification materials in which the compounds used in Examples 4 and 22–28 were used as the heat resistant inorganic compounds on which the transition metal oxide was supported could burn the particulates at the lower temperatures. It was seen that the exhaust gas purification materials containing titania were especially high in activity.

Example 29

An exhaust gas purification material was produced in the same manner as in Example 4, except that $TaO_2$ was used as the inorganic oxide having heat resistance on which the noble metal was supported.

Example 30

An exhaust gas purification material was produced in the same manner as in Example 4, except that $Nb_2O_5$ was used as the inorganic oxide having heat resistance on which the noble metal was supported.

Example 31

An exhaust gas purification material was produced in the same manner as in Example 4, except that $WO_3$ was used as the inorganic oxide having heat resistance on which the noble metal was supported.

Example 32

An exhaust gas purification material was produced in the same manner as in Example 4, except that $SnO_2$ was used as the inorganic oxide having heat resistance on which the noble metal was supported.

Example 33

An exhaust gas purification material was produced in the same manner as in Example 4, except that $SiO_2$ was used as the inorganic oxide having heat resistance on which the noble metal was supported.

Example 34

An exhaust gas purification material was produced in the same manner as in Example 4, except that $Al_2O_3$ was used as the inorganic oxide having heat resistance on which the noble metal was supported.

Example 35

An exhaust gas purification material was produced in the same manner as in Example 4, except that $ZrO_2$ was used as the inorganic oxide having heat resistance on which the noble metal was supported.

Evaluation Example 7

The particulate burning experiment was conducted on the exhaust gas purification materials of Examples 29–35 in the same manner as in Evaluation Example 2. The 5% burning temperatures of the exhaust gas purification materials in the burning test are shown in Table 7.

TABLE 7

|  | Transition metal oxide | Alkali metal sulfate | Noble metal | Inorganic oxide (supporting noble metal) | 5% burning temperature (° C.) |
|---|---|---|---|---|---|
| Example 4 | $Cu_5V_2O_{10}$ | Cesium sulfate | Pt | $TiO_2$ | 285 |
| Example 29 | $Cu_5V_2O_{10}$ | Cesium sulfate | Pt | $TaO_2$ | 287 |
| Example 30 | $Cu_5V_2O_{10}$ | Cesium sulfate | Pt | $Nb_2O_5$ | 306 |
| Example 31 | $Cu_5V_2O_{10}$ | Cesium sulfate | Pt | $WO_3$ | 299 |
| Example 32 | $Cu_5V_2O_{10}$ | Cesium sulfate | Pt | $SnO_2$ | 302 |
| Example 33 | $Cu_5V_2O_{10}$ | Cesium sulfate | Pt | $SiO_2$ | 311 |
| Example 34 | $Cu_5V_2O_{10}$ | Cesium sulfate | Pt | $Al_2O_3$ | 322 |
| Example 35 | $Cu_5V_2O_{10}$ | Cesium sulfate | Pt | $ZrO_2$ | 307 |

As can be seen from Table 7, when exhaust gas purification materials of the same structure were used, the exhaust gas purification materials in which the compounds used in Examples 4 and 29–35 were used as the heat resistant inorganic compounds on which the noble metal was supported could burn the particulates at the lower temperatures. It was seen that especially the exhaust gas purification materials containing titania were high in activity.

Example 36

1000 g of a titania powder (MC-90 manufactured by Ishihara Sangyo Co., Ltd.), 350 g of copper sulfate pentahydrate (manufactured by Wako Jun-yaku Co., Ltd.) as a salt of copper, 95 g of vanadium oxide sulfate (manufactured by Wako Jun-yaku Co., Ltd.) as a salt of vanadium, and 36 g of tetramminedichloroplatinum (manufactured by Soekawa Kagaku Co., Ltd.) as a salt of platinum were added to 3300 g of purified water, followed by stirring well and then vacuum drying by a cold evaporator. The resulting powder was calcined at 900° C. for 5 hours in an electric furnace to obtain a powder comprising titania on which platinum and a copper-vanadium composite oxide ($Cu_5V_2O_{10}$) were supported.

10 g of the thus obtained powder comprising titania on which platinum and a copper-vanadium composite oxide ($Cu_5V_2O_{10}$) as the transition metal oxide were supported and 10 g of cesium sulfate reagent were mixed in the state of powder in an agate mortar to obtain a powder catalyst containing cesium sulfate and a powder comprising titania on which platinum and the copper-vanadium composite oxide ($Cu_5V_2O_{10}$) were supported.

Example 37

1000 g of a titania powder (MC-90 manufactured by Ishihara Sangyo Co., Ltd.), 350 g of copper sulfate pentahydrate (manufactured by Wako Jun-yaku Co., Ltd.) as a salt of copper, and 95 g of vanadium oxide sulfate (manufactured by Wako Jun-yaku Co., Ltd.) as a salt of vanadium were added to 3300 g of purified water, followed by stirring well and then vacuum drying by a cold evaporator. The resulting powder was calcined at 900° C. for 5 hours in an electric furnace to obtain a powder comprising titania on which the copper-vanadium composite oxide ($Cu_5V_2O_{10}$) was supported.

580 g of the thus obtained powder comprising titania on which the copper-vanadium composite oxide ($Cu_5V_2O_{10}$) as the transition metal oxide was supported and 18 g of tetramminedichloroplatinum (manufactured by Soekawa Kagaku Co., Ltd.) were added to 1600 g of purified water, followed by stirring well and then vacuum drying by a cold evaporator. The resulting powder was calcined at 600° C. for 5 hours in an electric furnace to obtain a powder comprising titania on which platinum and the copper-vanadium composite oxide ($Cu_5V_2O_{10}$) were supported.

10 g of the thus obtained powder comprising titania on which platinum and the copper-vanadium composite oxide ($Cu_5V_2O_{10}$) were supported and 10 g of cesium sulfate reagent were mixed in the state of powder in an agate mortar to obtain a powder catalyst containing cesium sulfate and a powder comprising titania on which platinum and the copper-vanadium composite oxide ($Cu_5V_2O_{10}$) were supported.

Evaluation Example 8

The particulate burning experiment was conducted on the powder catalysts obtained in Examples 36 and 37 in the same manner as in Evaluation Example 1. The 5% burning temperatures of the exhaust gas purification catalysts in the burning test are shown in Table 8.

TABLE 8

|  | 5% burning temperature (° C.) |
| --- | --- |
| Example 36 | 221 |
| Example 37 | 222 |

As can be seen from Table 8, the particulates could also be burnt at low temperatures in the case of using the exhaust gas purification catalysts obtained in Examples 36 and 37.

Example 38

A powder catalyst was obtained in the same manner as in Example 36, except that CuO was used in place of $Cu_5V_2O_{10}$ as the transition metal oxide.

Example 39

A powder catalyst was obtained in the same manner as in Example 36, except that $MnO_2$ was used in place of $Cu_5V_2O_{10}$ as the transition metal oxide.

Example 40

A powder catalyst was obtained in the same manner as in Example 36, except that $CoO_3$ was used in place of $Cu_5V_2O_{10}$ as the transition metal oxide.

Example 41

A powder catalyst was obtained in the same manner as in Example 36, except that $V_2O_5$ was used in place of $Cu_5V_2O_{10}$ as the transition metal oxide.

Example 42

A powder catalyst was obtained in the same manner as in Example 36, except that $MoO_3$ was used in place of $Cu_5V_2O_{10}$ as the transition metal oxide.

Example 43

A powder catalyst was obtained in the same manner as in Example 36, except that $WO_3$ was used in place of $Cu_5V_2O_{10}$ as the transition metal oxide.

Example 44

A powder catalyst was obtained in the same manner as in Example 36, except that $Cu_2O$ was used in place of $Cu_5V_2O_{10}$ as the transition metal oxide.

Example 45

A powder catalyst was obtained in the same manner as in Example 36, except that $Cu_2O_3$ was used in place of $Cu_5V_2O_{10}$ as the transition metal oxide.

Example 46

A powder catalyst was obtained in the same manner as in Example 36, except that $CuV_2O_6$ was used in place of $Cu_5V_2O_{10}$ as the transition metal oxide.

Example 47

A powder catalyst was obtained in the same manner as in Example 36, except that $Cu_3V_2O_8$ was used in place of $Cu_5V_2O_{10}$ as the transition metal oxide.

Comparative Example 13

A powder catalyst was obtained in the same manner as in Example 36, except that $LaMnCoO_3$ was used in place of $Cu_5V_2O_{10}$ as the transition metal oxide.

Evaluation Example 9

The particulate burning experiment was conducted on the powder catalysts obtained in Examples 38–47 and Comparative Example 13 in the same manner as in Evaluation Example 1. The 5% burning temperatures of the exhaust gas purification catalysts in the burning test are shown in Table

9.

TABLE 9

|  | Transition metal oxide | Alkali metal sulfate | Noble metal | 5% burning temperature (° C.) |
|---|---|---|---|---|
| Example 36 | $Cu_5V_2O_{10}$ | Cesium sulfate | Pt | 221 |
| Example 38 | CuO | Cesium sulfate | Pt | 223 |
| Example 39 | $MnO_2$ | Cesium sulfate | Pt | 229 |
| Example 40 | $CoO_3$ | Cesium sulfate | Pt | 224 |
| Example 41 | $V_2O_5$ | Cesium sulfate | Pt | 325 |
| Example 42 | $MoO_3$ | Cesium sulfate | Pt | 326 |
| Example 43 | $WO_3$ | Cesium sulfate | Pt | 326 |
| Example 44 | $Cu_2O$ | Cesium sulfate | Pt | 322 |
| Example 45 | $Cu_2O_3$ | Cesium sulfate | Pt | 321 |
| Example 46 | $CuV_2O_6$ | Cesium sulfate | Pt | 322 |
| Example 47 | $Cu_3V_2O_8$ | Cesium sulfate | Pt | 322 |
| Comparative Example 13 | $LaMnCoO_3$ | Cesium sulfate | Pt | 354 |

As can be seen from Table 9, when exhaust gas purification catalysts of the same structure were used, the exhaust gas purification catalysts in which the compounds shown in Examples 38–47 were supported as the transition metal oxides could burn the particulates at the lower temperatures.

Example 48

A powder catalyst was obtained in the same manner as in Example 36, except that a mixture comprising potassium sulfate and cesium sulfate at a weight ratio of 1:1 was used in place of cesium sulfate as the alkali metal sulfate.

Comparative Example 14

A powder catalyst was obtained in the same manner as in Example 36, except that calcium sulfate was used in place of cesium sulfate as the alkali metal sulfate.

Evaluation Example 10

The particulate burning experiment was conducted on the powder catalysts obtained in Example 48 and Comparative Example 14 in the same manner as in Evaluation Example 1. The 5% burning temperatures of the exhaust gas purification catalysts in the burning test are shown in Table 10.

TABLE 10

|  | Transition metal oxide | Alkali metal sulfate | Noble metal | 5% burning temperature (° C.) |
|---|---|---|---|---|
| Example 36 | $Cu_5V_2O_{10}$ | Cesium sulfate | Pt | 221 |
| Example 48 | $Cu_5V_2O_{10}$ | Cesium sulfate + Potassium sulfate | Pt | 219 |
| Comparative Example 14 | $Cu_5V_2O_{10}$ | Calcium sulfate | Pt | 401 |

As can be seen from Table 10, when exhaust gas purification catalysts of the same structure were used, the exhaust gas purification catalyst in which the compound shown in Example 48 was used as the alkali metal sulfate could burn the particulates at the lower temperature.

Example 49

A powder catalyst was obtained in the same manner as in Example 36, except that $Ta_2O_5$ was used in place of titania as the carrier for catalyst.

Example 50

A powder catalyst was obtained in the same manner as in Example 36, except that $Nb_2O_5$ was used in place of titania as the carrier for catalyst.

Example 51

A powder catalyst was obtained in the same manner as in Example 36, except that $WO_3$ was used in place of titania as the carrier for catalyst.

Example 52

A powder catalyst was obtained in the same manner as in Example 36, except that $SnO_2$ was used in place of titania as the carrier for catalyst.

Example 53

A powder catalyst was obtained in the same manner as in Example 36, except that $SiO_2$ was used in place of titania as the carrier for catalyst.

Example 54

A powder catalyst was obtained in the same manner as in Example 36, except that $Al_2O_3$ was used in place of titania as the carrier for catalyst.

Example 55

A powder catalyst was obtained in the same manner as in Example 36, except that $ZrO_2$ was used in place of titania as the carrier for catalyst.

Comparative Example 15

A powder catalyst was obtained in the same manner as in Example 36, except that $Fe_2O_3$ was used in place of titania as the carrier for catalyst.

Evaluation Example 11

The particulate burning experiment was conducted on the powder catalysts obtained in Examples 49–55 and Comparative Example 15 in the same manner as in Evaluation Example 1. The 5% burning temperatures of the exhaust gas purification catalysts in the burning test are shown in Table 11.

TABLE 11

|  | Transition metal oxide | Alkali metal sulfate | Noble metal | Carrier | 5% burning temperature |
|---|---|---|---|---|---|
| Example 36 | $Cu_5V_2O_{10}$ | Cesium sulfate | Pt | $TiO_2$ | 221 |
| Example 49 | $Cu_5V_2O_{10}$ | Cesium sulfate | Pt | $Ta_2O_5$ | 218 |
| Example 50 | $Cu_5V_2O_{10}$ | Cesium sulfate | Pt | $Nb_2O_5$ | 223 |
| Example 51 | $Cu_5V_2O_{10}$ | Cesium sulfate | Pt | $WO_3$ | 223 |
| Example 52 | $Cu_5V_2O_{10}$ | Cesium sulfate | Pt | $SnO_2$ | 223 |
| Example 53 | $Cu_5V_2O_{10}$ | Cesium sulfate | Pt | $SiO_2$ | 221 |
| Example 54 | $Cu_5V_2O_{10}$ | Cesium sulfate | Pt | $Al_2O_3$ | 228 |
| Example 55 | $Cu_5V_2O_{10}$ | Cesium sulfate | Pt | $ZrO_2$ | 225 |
| Comparative Example 15 | $Cu_5V_2O_{10}$ | Cesium sulfate | Pt | $Fe_2O_3$ | 311 |

As can be seen from Table 11, when exhaust gas purification catalysts of the same structure were used, the exhaust gas purification catalysts in which the supports shown in Examples 49–55 were used could burn the particulates at the lower temperatures.

Example 56

1000 g of a titania powder (MC-90 manufactured by Ishihara Sangyo Co., Ltd.), 350 g of copper sulfate pentahydrate (manufactured by Wako Jun-yaku Co., Ltd.) as a salt of copper, 95 g of vanadium oxide sulfate (manufactured by Wako Jun-yaku Co., Ltd.) as a salt of vanadium, and 36 g of tetramminedichloroplatinum (manufactured by Soekawa Kagaku Co., Ltd.) as a salt of platinum were added to 3300 g of purified water, followed by stirring well and then vacuum drying by a cold evaporator. The resulting powder was calcined at 900° C. for 5 hours in an electric furnace to obtain a powder comprising titania on which platinum and a copper-vanadium composite oxide ($Cu_5V_2O_{10}$) were supported.

8 g of the thus obtained powder, 0.6 g of Polity (manufactured by Lion Co., Ltd.) as a dispersing agent, 200 g of purified water, and 100 g of zirconia balls of 2 mm were charged in a closed vessel of 100 ml, and dispersed for 2 hours by a slurry dispersing machine (manufactured by Red Devil Equipment Co.) to obtain a slurry.

Then, as a heat resistant three-dimensional structural body, a cordierite filter of wall-flow type (5.66 inches, 100 cells/inch, manufactured by NGK) was cut to 2 cells×5 cells×15 mm. This was impregnated with the slurry obtained above, and excess slurry was removed by an air gun, followed by carrying out a heat treatment at 600° C. for 5 hours in an electric furnace.

Then, 60 g of cesium sulfate (manufactured by Soekawa Kagaku Co., Ltd.) was added to 500 g of purified water, followed by stirring well to obtain an aqueous solution containing cesium sulfate. The filter obtained above was impregnated with this aqueous solution, and excess solution was removed by an air gun, followed by drying the filter with a dryer and heat treating it at 600° C. for 5 hours in an electric furnace to obtain an exhaust gas purification material.

Example 57

1000 g of a titania powder (MC-90 manufactured by Ishihara Sangyo Co., Ltd.), 350 g of copper sulfate pentahydrate (manufactured by Wako Jun-yaku Co., Ltd.) as a salt of copper, and 95 g of vanadium oxide sulfate (manufactured by Wako Jun-yaku Co., Ltd.) as a salt of vanadium were added to 3300 g of purified water, followed by stirring well and then vacuum drying by a cold evaporator. The resulting powder was calcined at 900° C. for 5 hours in an electric furnace to obtain a powder comprising titania on which the copper-vanadium composite oxide ($Cu_5V_2O_{10}$) was supported.

580 g of the thus obtained powder comprising titania on which the copper-vanadium composite oxide ($Cu_5V_2O_{10}$,) as the transition metal oxide was supported and 18 g of tetramminedichloroplatinum (manufactured by Soekawa Kagaku Co., Ltd.) were added to 1600 g of purified water, followed by stirring well and then vacuum drying by a cold evaporator. The resulting powder was calcined at 600° C. for 5 hours in an electric furnace to obtain a powder comprising titania on which platinum and the copper-vanadium composite oxide ($Cu_5V_2O_{10}$) were supported.

8 g of the thus obtained powder, 0.6 g of Polity (manufactured by Lion Co., Ltd.) as a dispersing agent, 200 g of purified water, and 100 g of zirconia balls of 2 mm were charged in a closed vessel of 100 ml, and dispersed for 2 hours by a slurry dispersing machine (manufactured by Red Devil Equipment Co.) to obtain a slurry.

Then, as a heat resistant three-dimensional structural body, a cordierite filter of wall-flow type (5.66 inches, 100 cells/inch, manufactured by NGK) was cut to obtain a filter of 2 cells×5 cells×15 mm. This was impregnated with the slurry solution obtained above, and excess slurry was removed by an air gun, followed by carrying out a heat treatment at 600° C. for 5 hours in an electric furnace.

Furthermore, 60 g of cesium sulfate (manufactured by Soekawa Kagaku Co., Ltd.) was added to 500 g of purified water, followed by stirring well to obtain an aqueous solution containing cesium sulfate. The filter obtained above was impregnated with this aqueous solution, and excess solution was removed by an air gun, followed by drying the filter with a dryer and heat treating it at 600° C. for 5 hours in an electric furnace to obtain an exhaust gas purification material.

Evaluation Example 12

The particulate burning experiment was conducted on the exhaust gas purification materials obtained in Examples 56 and 57 in the same manner as in Evaluation Example 2. The 5% burning temperatures of the exhaust gas purification materials in the burning test are shown in Table 12.

TABLE 12

|  | 5% burning temperature (° C.) |
| --- | --- |
| Example 56 | 266 |
| Example 57 | 265 |

As can be seen from Table 12, in the case of the exhaust gas purification materials obtained in Examples 56 and 57, the particulates could also be burnt at the lower temperatures.

Example 58

An exhaust gas purification material was obtained in the same manner as in Example 56, except that CuO was used in place of $Cu_5V_2O_{10}$ as the transition metal oxide.

Example 59

An exhaust gas purification material was obtained in the same manner as in Example 56, except that $MnO_2$ was used in place of $Cu_5V_2O_{10}$ as the transition metal oxide.

Example 60

An exhaust gas purification material was obtained in the same manner as in Example 56, except that $CoO_3$ was used in place of $Cu_5V_2O_{10}$ as the transition metal oxide.

Example 61

An exhaust gas purification material was obtained in the same manner as in Example 56, except that $V_2O_5$ was used in place of $Cu_5V_2O_{10}$ as the transition metal oxide.

Example 62

An exhaust gas purification material was obtained in the same manner as in Example 56, except that $MoO_3$ was used in place of $Cu_5V_2O_{10}$ as the transition metal oxide.

Example 63

An exhaust gas purification material was obtained in the same manner as in Example 56, except that $WO_3$ was used in place of $Cu_5V_2O_{10}$ as the transition metal oxide.

Example 64

An exhaust gas purification material was obtained in the same manner as in Example 56, except that $Cu_2O$ was used in place of $Cu_5V_2O_{10}$ as the transition metal oxide.

Example 65

An exhaust gas purification material was obtained in the same manner as in Example 56, except that $Cu_2O_3$ was used in place of $Cu_5V_2O_{10}$ as the transition metal oxide.

Example 66

An exhaust gas purification material was obtained in the same manner as in Example 56, except that $CuV_2O_6$ was used in place of $Cu_5V_2O_{10}$ as the transition metal oxide.

Example 67

An exhaust gas purification material was obtained in the same manner as in Example 56, except that $Cu_3V_2O_8$ was used in place of $Cu_5V_2O_{10}$ as the transition metal oxide.

Comparative Example 16

An exhaust gas purification material was obtained in the same manner as in Example 56, except that $LaMnCoO_3$ was used in place of $Cu_5V_2O_{10}$ as the transition metal oxide.

Evaluation Example 13

The particulate burning experiment was conducted on the exhaust gas purification materials obtained in Examples 58–67 and Comparative Example 16 in the same manner as in Evaluation Example 2. The 5% burning temperatures of the exhaust gas purification catalysts in the burning test are shown in Table 13.

TABLE 13

|  | Transition metal oxide | Alkali metal sulfate | Noble metal | 5% burning temperature (° C.) |
| --- | --- | --- | --- | --- |
| Example 56 | $Cu_5V_2O_{10}$ | Cesium sulfate | Pt | 266 |
| Example 58 | CuO | Cesium sulfate | Pt | 268 |
| Example 59 | $MnO_2$ | Cesium sulfate | Pt | 269 |
| Example 60 | $CoO_3$ | Cesium sulfate | Pt | 269 |
| Example 61 | $V_2O_5$ | Cesium sulfate | Pt | 268 |
| Example 62 | $MoO_3$ | Cesium sulfate | Pt | 269 |
| Example 63 | $WO_3$ | Cesium sulfate | Pt | 269 |
| Example 64 | $Cu_2O$ | Cesium sulfate | Pt | 268 |
| Example 65 | $Cu_2O_3$ | Cesium sulfate | Pt | 266 |
| Example 66 | $CuV_2O_6$ | Cesium sulfate | Pt | 267 |
| Example 67 | $Cu_3V_2O_8$ | Cesium sulfate | Pt | 268 |
| Comparative Example 16 | $LaMnCoO_3$ | Cesium sulfate | Pt | 371 |

As can be seen from Table 13, when exhaust gas purification catalysts of the same structure were used, the exhaust gas purification materials in which the transition metal oxides shown in Examples 58–67 were used could burn the particulates at the lower temperature.

Example 68

An exhaust gas purification material was obtained in the same manner as in Example 56, except that a mixture comprising potassium sulfate and cesium sulfate at a weight ratio of 1:1 was used in place of cesium sulfate as the alkali metal sulfate.

Comparative Example 17

An exhaust gas purification material was obtained in the same manner as in Example 56, except that calcium sulfate was used in place of cesium sulfate as the alkali metal sulfate.

Evaluation Example 14

The particulate burning experiment was conducted on the exhaust gas purification materials obtained in Example 68 and Comparative Example 17 in the same manner as in Evaluation Example 2. The 5% burning temperatures of the exhaust gas purification catalysts in the burning test are shown in Table 14.

TABLE 14

|  | Transition metal oxide | Alkali metal sulfate | Noble metal | 5% burning temperature (° C.) |
| --- | --- | --- | --- | --- |
| Example 56 | $Cu_5V_2O_{10}$ | Cesium sulfate | Pt | 266 |
| Example 68 | $Cu_5V_2O_{10}$ | Cesium sulfate + potassium sulfate | Pt | 264 |
| Comparative Example 17 | $Cu_5V_2O_{10}$ | Calcium sulfate | Pt | 421 |

As can be seen from Table 14, when exhaust gas purification catalysts of the same structure were used, the exhaust gas purification material in which the compound shown in Example 68 was used as the alkali metal sulfate could burn the particulates at the lower temperature.

Example 69

An exhaust gas purification material was obtained in the same manner as in Example 56, except that $Ta_2O_5$ was used in place of titania as the carrier for catalyst.

Example 70

An exhaust gas purification material was obtained in the same manner as in Example 56, except that $Nb_2O_5$ was used in place of titania as the carrier for catalyst.

Example 71

An exhaust gas purification material was obtained in the same manner as in Example 56, except that $WO_3$ was used in place of titania as the carrier for catalyst.

Example 72

An exhaust gas purification material was obtained in the same manner as in Example 56, except that $SnO_2$ was used in place of titania as the carrier for catalyst.

Example 73

An exhaust gas purification material was obtained in the same manner as in Example 56, except that $SiO_2$ was used in place of titania as the carrier for catalyst.

Example 74

An exhaust gas purification material was obtained in the same manner as in Example 56, except that $Al_2O_3$ was used in place of titania as the carrier for catalyst.

Example 75

An exhaust gas purification material was obtained in the same manner as in Example 56, except that $ZrO_2$ was used in place of titania as the carrier for catalyst.

Comparative Example 18

An exhaust gas purification material was obtained in the same manner as in Example 56, except that $Fe_2O_3$ was used in place of titania as the carrier for catalyst.

Evaluation Example 15

The particulate burning experiment was conducted on the powder catalysts obtained in Examples 69–75 and Comparative Example 18 in the same manner as in Evaluation Example 2. The 5% burning temperatures of the exhaust gas purification catalysts in the burning test are shown in Table 15.

TABLE 15

| | Transition metal oxide | Alkali metal sulfate | Noble metal | Carrier | 5% burning temperature (° C.) |
|---|---|---|---|---|---|
| Example 56 | $Cu_5V_2O_{10}$ | Cesium sulfate | Pt | $TiO_2$ | 266 |
| Example 69 | $Cu_5V_2O_{10}$ | Cesium sulfate | Pt | $Ta_2O_5$ | 268 |
| Example 70 | $Cu_5V_2O_{10}$ | Cesium sulfate | Pt | $Nb_2O_5$ | 267 |
| Example 71 | $Cu_5V_2O_{10}$ | Cesium sulfate | Pt | $WO_3$ | 267 |
| Example 72 | $Cu_5V_2O_{10}$ | Cesium sulfate | Pt | $SnO_2$ | 268 |
| Example 73 | $Cu_5V_2O_{10}$ | Cesium sulfate | Pt | $SiO_2$ | 267 |
| Example 74 | $Cu_5V_2O_{10}$ | Cesium sulfate | Pt | $Al_2O_3$ | 268 |
| Example 75 | $Cu_5V_2O_{10}$ | Cesium sulfate | Pt | $ZrO_2$ | 268 |
| Comparative Example 18 | $Cu_5V_2O_{10}$ | Cesium sulfate | Pt | $Fe_2O_3$ | 341 |

As can be seen from Table 15, when exhaust gas purification materials of the same structure were used, the exhaust gas purification materials in which the support shown in Examples 69–75 were used could burn the particulates at the lower temperature.

As explained above, the present invention can provide exhaust gas purification catalysts and exhaust gas purification materials having said catalysts which can burn and remove particulates in exhaust gases at low temperatures close to the temperatures of the exhaust gases and have a high catalytic activity for the burning of particulates.

What is claimed is:

1. An exhaust gas purification catalyst which contains a first catalyst component comprising an inorganic oxide having heat resistance and a transition metal oxide supported on the surface of the inorganic oxide; and a second catalyst component comprising at least one alkali metal sulfate, wherein the exhaust gas purification catalyst has a powder form.

2. An exhaust gas purification catalyst according to claim 1, which further contains a noble metal as a third catalyst component.

3. An exhaust gas purification catalyst according to claim 2, wherein the noble metal is supported on the surface of the inorganic oxide separately from the transition metal oxide.

4. An exhaust gas purification catalyst according to claim 2, wherein the noble metal is supported on the surface of the inorganic oxide together with the transition metal oxide.

5. An exhaust gas purification catalyst according to claim 2, wherein the noble metal is supported on the surface of the transition metal oxide.

6. An exhaust gas purification catalyst according to claim 2, wherein the noble metal comprises Pt.

7. An exhaust gas purification catalyst according to claim 1, wherein the transition metal oxide comprises at least one metal oxide of at least one metal selected from Cu, Mn, Co, V, Mo and W.

8. An exhaust gas purification catalyst according to claim 1, wherein the transition metal oxide comprises at least one Cu oxide selected from CuO, $Cu_2O$ and $Cu_2O_3$.

9. An exhaust gas purification catalyst according to claim 1, wherein the transition metal oxide comprises a composite metal oxide of Cu and V.

10. An exhaust gas purification catalyst according to claim 1, wherein the transition metal oxide comprises at least one composite metal oxide selected from $Cu_5V_2O_{10}$, $CuV_2O_6$ and $Cu_3V_2O_8$.

11. An exhaust gas purification catalyst according to claim 1, wherein the alkali metal sulfate comprises cesium sulfate.

12. An exhaust gas purification catalyst according to claim 1, wherein the alkali metal sulfate comprises a mixture of cesium sulfate and potassium sulfate.

13. An exhaust gas purification catalyst according to claim 1, wherein the heat resistant inorganic oxide comprises at least one inorganic oxide selected from $Ta_2O_5$, $Nb_2O_5$, $WO_3$, $SnO_2$, $SiO_2$, $TiO_2$, $Al_2O_3$ and $ZrO_2$.

14. An exhaust gas purification catalyst according to claim 1, wherein the heat resistant inorganic oxide is a powder having a particle diameter of 0.1–1000 μm.

15. An exhaust gas purification material which comprises a three-dimensional structural body having heat resistance and the exhaust gas purification catalyst of claim 1 formed on the three-dimensional structural body, wherein the three-dimensional body contacts with at least one member selected from the group consisting of the transitional metal oxide of the first catalyst component and the second catalyst component.

16. An exhaust gas purification material according to claim 15, wherein the exhaust gas purification catalyst further comprises a noble metal as a third catalyst component.

17. An exhaust gas purification material according to claim 16, wherein the noble metal is supported on the surface of the inorganic oxide separately from the transition metal oxide.

18. An exhaust gas purification material according to claim 16, wherein the noble metal is supported on the surface of the inorganic oxide together with the transition metal oxide.

19. An exhaust gas purification material according to claim 16, wherein the noble metal is supported on the surface of the transition metal oxide.

20. An exhaust gas purification material according to claim 16, wherein the noble metal comprises Pt.

21. An exhaust gas purification material according to claim 15, wherein the second catalyst component is supported on the upper surface of the first catalyst component.

22. An exhaust gas purification material according to claim 15, wherein the transition metal oxide comprises at least one metal oxide of at least one metal selected from Cu, Mn, Co, V, Mo and W.

23. An exhaust gas purification material according to claim 15, wherein the transition metal oxide comprises at least one Cu oxide selected from CuO, $Cu_2O$ and $Cu_2O_3$.

24. An exhaust gas purification material according to claim 15, wherein the transition metal oxide comprises a composite metal oxide of Cu and V.

25. An exhaust gas purification material according to claim 15, wherein the transition metal oxide comprises at least one composite metal oxide selected from $Cu_5V_2O_{10}$, $CuV_2O_6$ and $Cu_3V_2O_8$.

26. An exhaust gas purification material according to claim 15, wherein the alkali metal sulfate comprises cesium sulfate.

27. An exhaust gas purification material according to claim 15, wherein the alkali metal sulfate comprises a mixture of cesium sulfate and potassium sulfate.

28. An exhaust gas purification material according to claim 15, wherein the heat resistant inorganic oxide comprises at least one inorganic oxide selected from $Ta_2O_5$, $Nb_2O_5$, $WO_3$, $SnO_2$, $SiO_2$, $TiO_2$, $Al_2O_3$ and $ZrO_2$.

29. An exhaust gas purification material according to claim 15, wherein the heat resistant three-dimensional structural body is a wall-flow honeycomb-shaped filter or a flow-through foam or metallic filter.

30. An exhaust gas purification material which comprises a three-dimensional structural body having heat resistance and an exhaust gas purification catalyst formed on the three-dimensional structural body, the exhaust gas purification catalyst comprising a first catalyst component comprising an inorganic oxide having heat resistance and a transition metal oxide supported on the surface of the inorganic oxide; and a second catalyst component comprising at least one alkali metal sulfate, wherein the first catalyst component is contained in the second catalyst component.

* * * * *